W. F. BOAST.
WATCH MECHANISM.
APPLICATION FILED SEPT. 3, 1913.

1,114,101.

Patented Oct. 20, 1914.

Witnesses

Inventor
W. F. Boast.
By _____, Attorneys.

UNITED STATES PATENT OFFICE.

WILLIAM F. BOAST, OF STERLING, COLORADO.

WATCH MECHANISM.

1,114,101.  Specification of Letters Patent.  Patented Oct. 20, 1914.

Application filed September 3, 1913. Serial No. 787,900.

*To all whom it may concern:*

Be it known that I, WILLIAM F. BOAST, a citizen of the United States, residing at Sterling, in the county of Logan and State of Colorado, have invented certain new and useful Improvements in Watch Mechanism, of which the following is a specification.

My invention relates to new and useful improvements in watch mechanisms, and more particularly to an improved method of pivoting the balance staff of watches, the primary object of my invention being to provide yieldable bearings between the ends of the staff in order that the jewels of said bearings may not be cracked, or broken from sudden shocks and jars.

A further object of my invention is to provide a bearing employing a pair of jewels for each staff end, one of the jewels taking up the longitudinal thrust of the staff and the other the lateral thrust thereof, both bearings being yieldably supported. And, a still further object of my invention is to provide means for positively limiting both lateral and longitudinal movement of the balance staff before the limit of such jewels is reached.

With these and other objects in view, my invention will be more fully described, illustrated in the accompanying drawings and then specifically pointed out in the claims, which are attached to and form a part of this application.

For a full understanding of the invention reference is to be had to the following description and accompanying drawings, in which:—

Figure 1:
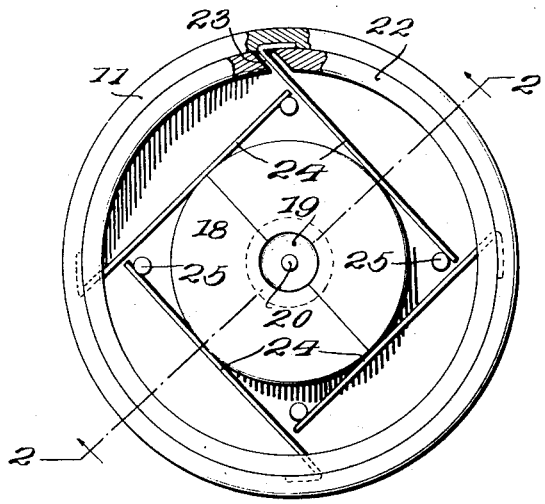
Figure 3:
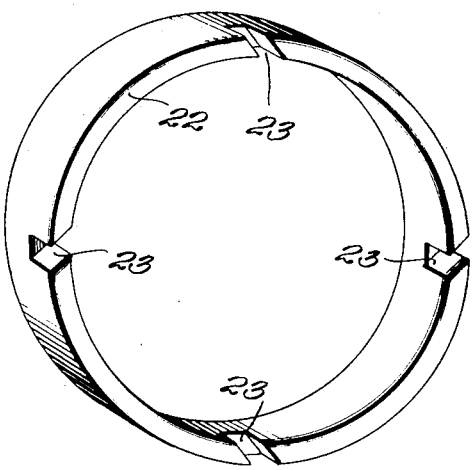
Figure 2:
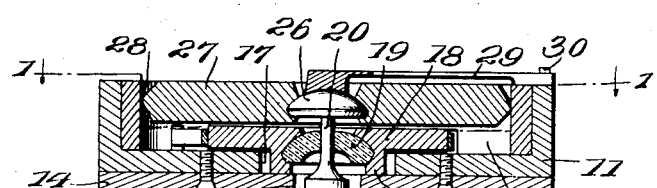
Figure 2:
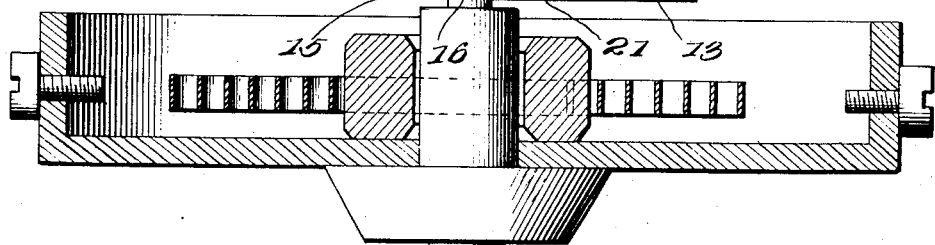
Figure 2:
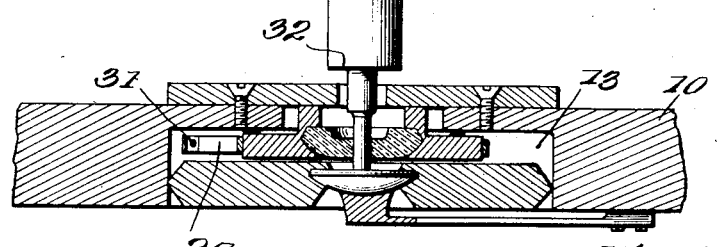

Figure 1 is a top plan view of one of my improved staff bearings. Fig. 2 is a sectional view on the line 2—2 of Fig. 1, showing both the upper and lower bearings and the balance staff in position. Fig. 3 is a perspective view of the locking ring employed in connection with the upper bearing.

Corresponding and like parts are referred to in the following description and indicated in all the views of the accompanying drawings by the same reference characters.

In the drawings, which are of necessity, shown upon a greatly enlarged scale, 10 designates the lower case and 11 the upper bracket for supporting the upper end of the balance staff 12, the case and bracket being provided with circular recesses 13 for the reception of the bearings of the staff.

Secured to the lower face of the bracket 11 is a stop-plate 14 having a central opening 15 slightly greater in diameter than the pivot 16 of the staff, this pivot extending into the opening which is in alinement with the larger opening 17 formed in the bracket and communicating with the recesses 13. A disk-shaped jewel-supporting member 18 is mounted in the recess 13 of the bracket and carries a jewel 19 perforated to receive the reduced terminal 20 of the pivot 16, this terminal passing completely through the perforation of the jewel. The jewel may be secured in the jewel-supporting member in any suitable manner, the said member usually being formed in two parts, and the parts being secured together after the positioning of the jewel. The jewel-supporting member is provided with an annular flange 21 which engages against the inner face of the plate 14 and which is free to move within the limits of the opening 17 of the bracket. It will therefore be clear that the jewel-supporting member is free for limited lateral movement. In order to hold said member 18 in properly centralized position under normal conditions I provide a ring 22 proportioned to fit snugly within the recess 13 and having its lower edge notched as shown at 23 for the passage of the ends of the leaf-springs 24, the outer ends of said springs after passage through the notches being bent upon themselves to seat between the ring and the bracket, the ring thereby serving as a means for locking the springs in place. The intermediate portions of the leaf-spring 24 bear against the peripheral edge of the jewel holding member 18 and are held against too close engagement therewith by stop pins 25, the upper ends of which extend somewhat above the upper face of the member 18. It will therefore be seen that although the jewel-holding member is normally held in properly centralized position by these springs that under sudden jars or shocks this member may move against the springs and therefore permit movement of the balance staff pivot. Such movement will, however, be ultimately limited by the engagement of the pivot against the plate 14.

A cap jewel 26 mounted in a second jewel-carrying member 27 engages against the end of the pivot 16 to act as a thrust bearing for the staff. This second jewel-carrying member is practically the same in construction as the first, with the exception that it is not provided with any flange and that its peripheral edge portion is doubly beveled to provide a knife edge bearing 28 engaging against the inner face of the ring 22. Under normal conditions this second bearing member is supported on the upper ends of the pins 25 and therefore slightly spaced relation above the first jewel bearing member 18. A spring-arm 29 is fastened by a screw 30 to the upper face of the bracket 11 and its free end extends inwardly and engages against the cap-jewel 26 to yieldably hold the same in engagement with the pivot.

The bearing construction forming a support for the pivot of the balance staff is identical with that previously described, with the single exception that the springs 24 instead of being secured in place by a slotted ring, are secured by their ends directly to the casing 10 by screws, or other suitable fastening devices 31, the ring being therefore omitted. Either of these methods of securing the springs 24 in place may be employed at both bearings or one at each bearing, if preferred. The employment of the ring is, however, in many instances desirable, as it permits the ready removal of the springs from the watch.

From the foregoing description, taken in connection with the drawings, the operation of the bearing mechanism, above described, may be readily understood, and its advantages appreciated.

The springs 24 supporting the bearing members 18 as they do, in effect, making floating bearings of said members permit of lateral movement of the jewels carried thereby under sudden shocks. In like manner the spring-held cap-jewels may move toward and away from each other to permit limited longitudinal movement of the balance staff. This longitudinal movement of the balance staff is of course, limited, by engagement of the shoulders 32 formed between the body proper of the staff and the pivots 16 against the inner faces of the plates 14.

I do not wish in any way to limit myself to the specific details of construction illustrated and described, as various minor changes, within the scope of the appended claims, may be made at any time, without in the slightest degree departing from the spirit of my invention.

What I claim is:—

1. A pivot bearing for balance staffs including an inner jewel-carrying member yieldably mounted for lateral movement, and an outer jewel-carrying member yieldably mounted for movement toward and away from the inner member.

2. A pivot bearing for balance staffs including a support provided with a bearing receiving recess, a stop-plate secured against the unrecessed face of the support and perforated for the passage of the pivot, a ring mounted in the recess and provided in its lower edge with notches, an inner jewel-carrying member positioned in the recesses and for longitudinal movement therein, leaf-springs engaging against the peripheral edge of the inner jewel-carrying member and having their outer ends passed through the notches of the ring and clamped between the ring and support, a jewel carried by said member and perforated for the passage of the pivot, an outer jewel-carrying member mounted in the recess and free for movement toward and away from the pivot, a cap-jewel carried by said latter member and engaging against the end of the pivot, and a spring secured by one end to the support and bearing by its free end against the cap-jewel to yieldably hold the same against the pivot.

3. A pivot bearing for balance staffs including a support provided with a bearing receiving recess, a jewel yieldably supported in said recess for lateral movement and perforated for the passage of the pivot, and a cap jewel yieldably held against the end of the pivot for movement toward and away from the first jewel.

4. A pivot bearing for balance staffs including a support provided with a bearing receiving recess, a stop plate secured against the unrecessed face of the support and perforated for the passage of the pivot, a ring mounted in the recess and provided with notches, a jewel carrying member positioned in the recess, leaf springs seating at their outer ends in the notches of the ring and engaging the peripheral edge of the jewel carrying member with their inner ends, a jewel carried by said member perforated for the passage of the pivot, an outer jewel carrying member mounted in the recess, and a cap jewel carried by said member and bearing against the end of the pivot.

In testimony whereof I affix my signature in presence of two witnesses.

WILLIAM F. BOAST. [L. S.]

Witnesses:
F. N. KERMER,
W. B. CONRAD.